United States Patent

[11] 3,599,050

| [72] | Inventor | Chifumi Komatsu<br>Suwa-shi, Japan |
|---|---|---|
| [21] | Appl. No. | 820,201 |
| [22] | Filed | Apr. 29, 1969 |
| [45] | Patented | Aug. 10, 1971 |
| [73] | Assignee | Kabrishiki Kaisha Suwa Seikosha |
| [32] | Priority | Apr. 30, 1968 |
| [33] | | Japan |
| [31] | | 43/28,686 |

[54] BRUSHLESS DIRECT CURRENT MOTOR
4 Claims, 9 Drawing Figs.

| [52] | U.S. Cl. | 318/138, 318/254 |
|---|---|---|
| [51] | Int. Cl. | H02k 29/00 |
| [50] | Field of Search | 318/138, 254, 439, 129, 132 |

[56] References Cited
UNITED STATES PATENTS

| 2,843,742 | 7/1958 | Cluwen | 318/132 X |
|---|---|---|---|
| 3,156,857 | 11/1964 | Herr et al. | 318/132 |
| 3,184,623 | 5/1965 | Marti et al. | 318/132 X |
| 3,239,739 | 3/1966 | Scholl | 318/138 |
| 3,339,133 | 8/1967 | Faure | 318/138 |
| 3,471,762 | 10/1969 | Urban | 318/254 X |
| 3,356,919 | 12/1967 | Reich | 318/132 X |

*Primary Examiner* — G. R. Simmons
*Attorney* — Blum, Moscovitz, Friedman and Kaplan ABSTRACT: A brushless direct current motor having pairs of axially spaced permanent magnets radially arranged about and fixed to a rotor shaft, driving coils disposed in the space between said pairs of permanent magnets and detecting means including detecting coils.

BRUSHLESS DIRECT CURRENT MOTOR

BACKGROUND OF THE INVENTION

This invention relates generally to brushless direct current motors adapted for operation in connection with transistorized driving circuits. Many forms of such direct current motors have been proposed but they all suffer from the disadvantages of not being self starting and of failing to consistently rotate the rotor thereof in a predetermined direction. One proposed approach to overcome these difficulties is the provision of a hall effect sensing element but the cost of such elements is extremely high. By providing a proper alignment of driving coils and detecting arrangement, the foregoing defects have been avoided while providing a brushless direct current motor of relatively low cost.

SUMMARY OF THE INVENTION

Generally speaking, in accordance with the invention, a brushless direct current motor is provided which includes pairs of axially spaced permanent magnets radially arranged about and fixed relative to a rotor shaft. Driving coils are disposed in the space between said pairs of permanent magnets and a detecting means having detecting coils is also provided. At least one detecting coil is provided for each driving coil, the number thereof preferably equaling one half of the number of pairs of permanent magnets provided. The driving coils are radially arranged about said rotor shaft so that, at any position of said permanent magnets, at least one of said driving coils is positioned with each of two sides thereof within the gap between different pairs of permanent magnets, said different pairs of permanent magnets being aligned to produce a force on said rotor shaft in the same direction. Further, said detecting means is disposed so that the detecting coils associated with at least one of the driving coils aligned to produce a force on said rotor shaft is activated.

The detecting means preferably includes a plurality of pairs of axially spaced detecting coils spaced about said rotor shaft and a conducting shield plate mounted for rotation with said rotor shaft and extending into the space between said detecting coils, said shield plate being formed with portions cut away to permit activation, at any position of said shield plate of at least the detecting coil associated with at least one of the driving coils aligned to produce a driving force at that position.

Accordingly, it is an object of this invention to provide a brushless direct current motor adapted to be self starting irrespective of the rest position of the rotor.

Another object of the invention is to provide a brushless direct current motor which always starts rotating in the predetermined direction.

Still another object of the invention is to provide a brushless direct current motor of extremely simple construction and relatively low cost.

Another object of the invention is to provide a brushless direct current motor particularly adapted for operation in connection with transistorized driving circuits.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENT

Figure 1:
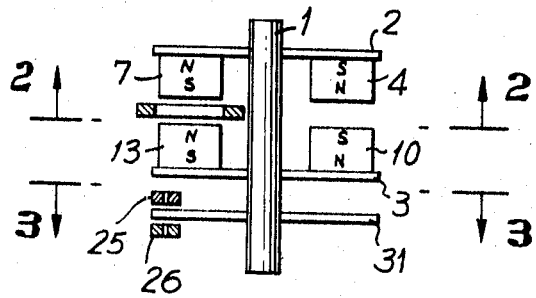
FIG. 1 is a sectional view taken across the rotor of the brushless direct current motor according to the invention.
Figure 2:
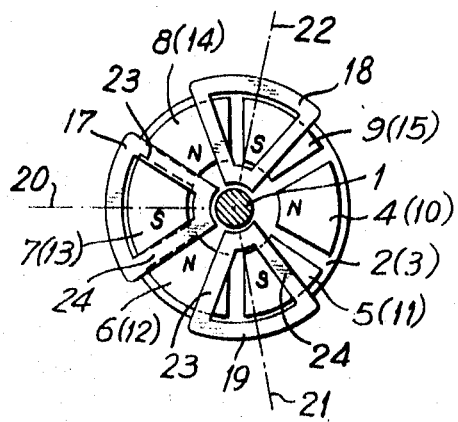
FIG. 2 is a sectional view taken along lines 2—2 of FIG. 1.
Figure 3:
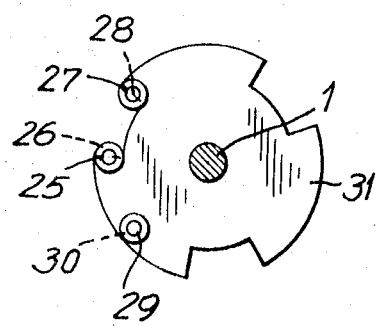
FIG. 3 is a sectional view taken along lines 3—3 of FIG. 1.

Referring now to FIGS. 1—3, the direct current brushless motor shown includes a rotor shaft 1 having yokes 2 and 3 mounted thereon in spaced relation. Arranged radially about shaft 1 are pairs of permanent magnets 4 and 10, 5 and 11, 6 and 12, 7 an 13, 8 and 14, and 9 and 15. One of each of said pairs of electromagnets, namely magnets 4, 5, 6, 7, 8 and 9, are fixedly secured to yoke 2, while the other of said permanent magnets are fixedly secured to yoke 3. Each of said permanent magnets is fan shaped. Each of said pairs of permanent magnets are in spaced relation and disposed with opposite poles in facing relation. Thus, the south pole of magnet 7 faces the north pole of magnet 13. Further, the six poles secured to each yoke are disposed so that adjacent magnets have their opposite poles facing the airgap between said pairs of permanent magnets. Thus, permanent magnet 4 has its north pole facing the airgap and its companion permanent magnet 10, while the adjacent permanent magnets 9 and 5 both have their south poles facing said airgap and their respective companion magnets.

Disposed in the airgap between said pairs of permanent magnets are substantially trapezoidal flat driving coils 17, 18 and 19. Said driving coils are radially arranged about rotor shaft 1 but are mounted independently thereof. The angle defined by the centerlines 20 and 21 of driving coils 17 and 19 respectively is preferably 100° as is the angle defined by centerlines 22 and 20 of driving coils 18 and 17 respectively. The sides 23 and 24 of each driving coils are spaced so that one of said sides is disposed in the space between each of two adjacent pairs of permanent magnets in substantially all positions of rotor shaft 1. Thus, in FIG. 2, side 23 of driving coil 19 is shown disposed in the space between the pair of permanent magnets 6 and 12 while side 24 of driving coil 19 is disposed between the pair of permanent magnets 5 and 11. In the position shown, driving coil 17 is aligned with the gaps between adjacent pairs of said permanent magnets while the other of said driving coils are aligned as described above.

Also provided is a detecting means consisting of three pairs of detecting coils 25 and 26, 27 and 28, and 29 and 30, as more particularly shown in FIG. 3. Said detecting coils are preferably formed in the shape of small discs with the detecting coils forming each pair being disposed in spaced relation with an airgap therebetween. Said pairs of detecting coils are disposed radially about rotor shaft 1 with an angle of 40° being defined between pairs 25, 26 and 27, 28, and 29, 30 respectively. Said detecting means also includes a shield plate 31 fixedly mounted to rotor shaft 1 and extending into the gap between said pairs of detecting coils. The shield plate is formed with three cutaway regions within the path of said detector coil airgaps. Said cutaway regions are spaced radially about rotor shaft 1, each of said openings defining a 40° sector. Shield plate 31 is preferably formed from a material of low electric resistance, such as aluminum.

Figure 4:
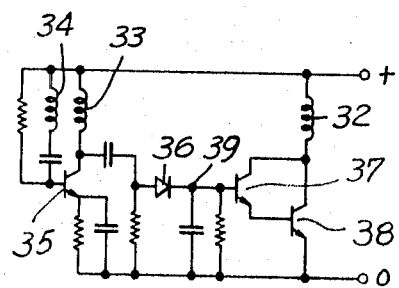
FIG. 4 is a circuit diagram of a driving circuit for the motor of FIG. 1.
Figure 5A:
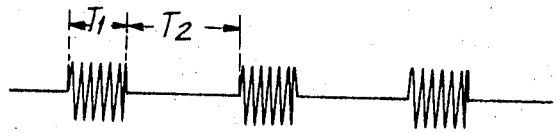
FIGS. 5A and B are wave forms present in the circuit of FIG. 4.
Figure 5B:

Referring now to FIG. 4, a portion of the electric circuit for driving the brushless direct current motor according to the invention is shown by way of example. The circuit includes an oscillator formed from transistor 35 and detecting coils 33 and 34, which, would correspond to one pair of detecting coils such as coils 25 and 26. The output of the oscillator passes through a rectifier defined by diode 36 and is applied to an amplification and switching circuit defined by transistors 37 and 38 adapted to apply driving current to driving coil 32. Said driving coils would correspond, for example, to driving coils 17. Reference is now had to the waveform diagrams of FIGS. 5 and 6, in connection with which the operation of the brushless direct current motor according to the invention will be explained. Assuming that one of the cutaway regions of shield plate 31 is disposed at the pair of detecting coils 25 and 26, the oscillator circuit associated with said detector coils, consisting for example of transistor 35 and coils 33, 25 and 34, 26, starts to oscillate to produce the wave form shown in FIG. 5A at the collector of said transistor. This oscillating wave has a pulse width of $T_1$ equal to the period during which the opening in shield plate 31 is positioned opposite detecting coils 25 and 26. The oscillating circuit is rectified by diode 36 to produce, at connecting point 39 of FIG. 4, the driving waveform shown in FIG. 5B. During the period $T_1$, transistors 37 and 38 are switched on to apply the driving current to driving coil 32 which corresponds to driving coil 17. The oscillator circuit stops oscillating when shield plate 31 extends into the gap between detecting coils 25 and 26 since said shield plate is formed of a conductor. The driving current in driving coil 17 interlinks with the magnetic flux of the pairs of permanent magnets between which the sides 23 and 24 of said coil extend. Accordingly, a rotational force is produced tending to rotate shaft 1, carrying yokes 2 and 3, the permanent magnets, and shield plate 31 therewith. The time $T_2$ shown in the waveform of FIG. 5A represents the period during which the shield plate extends into the gap between the pair of detecting coils to stop oscillation thereof. The cycle, as far as detecting coils 25 and 26 and driving coils 17, is repeated after the time $T_2$ as represented by the rotation of the rotor by 80° to align the next cutaway region of the shield plate with said detecting coils.

Figure 6A:
FIGS. 6A, B and C are wave forms of the current in the three driving coils of the brushless direct current motor of FIG. 1.
Figure 6B:
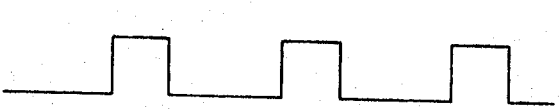
Figure 6C:
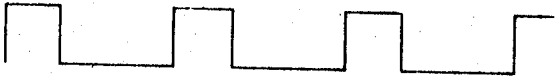

In the embodiment of the arrangement shown in the drawings, three pairs of detecting coils and three corresponding driving coils are provided. Accordingly, the motor according to the invention would be provided with three transistorized driving circuits. Each of the three driving circuits drives a driving coils to produce three phases of driving current as shown in the waveforms of FIGS. 6A, B and C, one of which represents the current in each of said driving coils. Due to the relative position of the detecting coils, driving coils, and shield plates and the alignment of the poles of the permanent magnets, rotor 1 always rotates in the predetermined direction.

The pairs of detecting coils are arranged radially about shaft 1 so that the cutaway region of shield plate 31 is aligned with at least one of said pairs of detecting coils at every position of said rotor shaft. Thus, one of said pairs of coils oscillates at each such position to drive the driving coil associated therewith. Further, said driving coil associated with the oscillating detecting coils must be disposed so that, during the period of said oscillation, it is not aligned with only one of the pairs of permanent magnets. This arrangement is necessary to ensure that the motor is self starting since if a driving coil is aligned with only one pair of permanent magnets at the rest position, no rotating force will be generated in response to the oscillation of the detecting coils to start the motor.

Although the motor in the embodiment shown in the drawings has six pairs of permanent magnets, three driving coils, three pairs of detecting coils and three cutaway regions in the shield plate, this arrangement is shown by way of example and not by way of limitation, and the motor according to the invention may be designed with various combinations of coils and openings. In general, the motor should be constructed such that where $n$ pairs of permanent magnets are provided, $n$ being an even number equal to six or more, $n/2$ driving coils, $n/2$ pairs of detecting coils, and $N/2$ cutaway regions of the shield plate are provided. Further, the detecting coils of the detecting means may consist of only a single oscillating coil the oscillation of which can be stopped by bringing said shield plate into juxtaposition with said coil.

The above-described arrangement provides a brushless direct current motor particularly adapted to be operated in connection with transistorized circuits. The motor is compact and offers the substantial advantage of being self starting and rotating consistently in a predetermined direction. Further, the motor is relatively inexpensive and simple to manufacture.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

What I claim is:

1. A direct current brushless motor comprising a rotor shaft, a pair of spaced substantially radially extending yokes mounted on said shaft for rotation therewith; a plurality of pairs of permanent magnets circumferentially arranged about said shaft between said yokes, one of each of said pairs of permanent magnets being mounted on each of said yokes with a gap therebetween; a plurality of air core driving coils disposed in nonoverlapping relation in the gap between said pairs of permanent magnets; driving circuit means coupled to said driving coils for applying a driving current thereto when actuated; and a detecting means responsive to the position of said rotor shaft and having at least one detecting coil means associated with each driving coil and coupled to said driving circuit means for the activation thereof to apply a driving current to the respective driving coil to rotate said rotor shaft, said detecting means including a shield ring formed from a conducting material, said detecting coil means being juxtaposed to said shield ring, said shield ring having cutaway portions in the path of said detecting coil means to permit the operation of each detecting coil means when said cutaway portions are aligned therewith for the application of driving current to the driving coil associated with said detecting coil means.

2. A direct current brushless motor as recited in claim 1, wherein two of said pairs of permanent magnets and one detecting coil are provided for each of said driving coils.

3. A direct current brushless motor comprising a rotor shaft, a pair of spaced substantially radially extending yokes mounted on said shaft for rotation therewith, a plurality of pairs of permanent magnets circumferentially arranged about said shaft between said yokes, one of each of said pairs of permanent magnets being mounted on each of said yokes with a gap therebetween; a plurality of air core driving coils disposed in nonoverlapping relation in the gap between said pairs of permanent magnets; driving circuit means coupled to said driving coils for application of driving current thereto when actuated; and a detecting means responsive to the position of said rotor shaft and having at least one detecting coil associated with each driving coil and coupled to said driving circuit means for the activation thereof to apply a driving current to the respective driving coil to rotate said rotor shaft, the driving coils activated at each position of said rotor shaft being disposed in the gap defined by selected pairs of permanent magnets, the position and polarity of said pairs of permanent magnets being selected to produce a force on said rotor shaft in a predetermined direction when portions of an activated driving coil are disposed in the respective gaps therebetween, the poles of adjacent permanent magnets on each of said yokes being of different polarity, said driving coils having at least two sides, one of said sides being disposed in the gap defined by each of two adjacent pairs of permanent magnets selected to produce a force on said rotor shaft in a predetermined direction, at least when said driving coils are activated in response to said detecting coils.

4. A direct current brushless motor as recited in claim 3, wherein said detecting means includes a shield ring formed from a conducting material, said detecting coil means being juxtaposed to said shield ring, said shield ring having cutaway portions in the path of said detecting coils to permit the operation of each detecting coil when said cutaway portions are aligned therewith for the application of driving current to the driving coil associated with said detecting coil, said cutaway portions and detector coils being positioned for the selective application of driving current to said driving coils whereby said motor is self-starting in a predetermined direction.